US006976579B2

(12) United States Patent
Molnar et al.

(10) Patent No.: US 6,976,579 B2
(45) Date of Patent: Dec. 20, 2005

(54) COMPACT DISC CASE WITH DISPLAY WINDOW

(75) Inventors: Dorina M. Molnar, Boxborough, MA (US); Eric B. DeWitt, Arlington, MA (US); Henry L. Collins, Maynard, MA (US); Mark E. Hazel, Concord, MA (US)

(73) Assignee: Swing LTD, Concord, MA (US)

( * ) Notice: Subject to any disclaimer, the term of this patent is extended or adjusted under 35 U.S.C. 154(b) by 90 days.

(21) Appl. No.: 10/403,866

(22) Filed: Mar. 31, 2003

(65) Prior Publication Data

US 2004/0188287 A1  Sep. 30, 2004

(51) Int. Cl.[7] .............................................. B65D 85/57
(52) U.S. Cl. .................................. 206/308.1; 206/311
(58) Field of Search ........................ 206/308.1, 308.2, 206/308.3, 769, 776, 777, 311; 220/662, 220/665

(56) References Cited

U.S. PATENT DOCUMENTS

| | | | | |
|---|---|---|---|---|
| 5,263,581 A | * | 11/1993 | Rosen | 206/308.1 |
| 5,417,365 A | * | 5/1995 | Lindsay | 229/117.22 |
| 5,611,426 A | * | 3/1997 | Warfield | 206/308.1 |
| 5,662,218 A | * | 9/1997 | Ladwig | 206/313 |
| 5,713,462 A | * | 2/1998 | Hansen | 206/308.1 |
| 5,785,399 A | * | 7/1998 | Frankeny et al. | 312/324 |
| 5,839,575 A | * | 11/1998 | Blanco | 206/232 |
| 6,012,575 A | * | 1/2000 | Eskandry | 206/308.1 |
| 6,170,657 B1 | * | 1/2001 | Allsop et al. | 206/308.1 |
| 6,182,823 B1 | * | 2/2001 | Rinde | 206/232 |
| 6,186,321 B1 | * | 2/2001 | Eskandry | 206/308.1 |
| 6,378,696 B1 | * | 4/2002 | Smouha | 206/18 |
| 2003/0042154 A1 | * | 3/2003 | Koch | 206/308.1 |

* cited by examiner

*Primary Examiner*—Derris H. Banks
*Assistant Examiner*—Faye Francis
(74) *Attorney, Agent, or Firm*—Robert K. Tendler (57) ABSTRACT

A CD case in the form of a hinged clamshell is provided with a transparent display window central to one surface of the case, with the case being provided with CD holders within the case mounted in such a way that the central portion of the CD is exposed through the transparent central window. The CD case permits the display of indicia on the CD contained therein through the window, or in an alternative embodiment a centrally apertured pocket is placed between the CD case window and the interior of the case, with the pocket being adapted to house indicia-carrying inserts for displaying the indicia through the central CD case window. In one embodiment, scratching of the window is minimized through the utilization of a piping detail around the periphery the window which spaces the exterior surface of the case from the exterior surface of the window, thus providing protection for the window.

10 Claims, 9 Drawing Sheets

COMPACT DISC CASE WITH DISPLAY WINDOW

FIELD OF INVENTION

This invention relates to Compact Disc cases and more particularly to apparatus to permit display of CDs within the case, presentation of indicia at the case and mounting of the case on a rack mount display.

BACKGROUND OF THE INVENTION

Compact discs or CDs have typically been marketed or mounted in so-called jewel cases, with these jewel cases then stored one on top of other in a CD disc rack so that the CD's may be assessable for use.

While CD racks may be free standing or mounted to some other object such as a wall or side of a stereo component case, there is a requirement to be able to easily transport a number of CDs from one location to another without damage to the CDs. Portable CD cases have existed which include a clamshell type case having a hinge and in one embodiment zippered around three sides to permit transporting of the CDs within the case and opening of the case. However, there are no means provided to house labels or other indicia at the surface of the CD case so as to indicate what CDs are contained therein. Nor is there any opportunity to be able to provide a label at the case itself for advertising or other purposes. Moreover, just simply stacking CDs in a CD case of this type can result in scratching of the surfaces of the CDs, making them unusable.

Also when these CD cases are sold they are ordinarily simply thrown in a bin, with no attention being paid as to how the CD cases are to be displayed. The result is that the CD cases in the past have become battered, shop worn and not easily presented to the public in a pleasing manner.

It will be appreciated that compact discs as presently marketed have an upper surface for labeling which is provided with an indication of the content of the CD itself. The labeling may be confined to a center portion of the CD ROM disc about the center spindle receiving aperture.

For those CD cases which are opaque there is no opportunity to indicate to the individual either what CDs are contained in the case or to provide for any labeling which is visible to the user. Moreover, there is no way to personalize the CD case to the individual's likes or tastes, with the prior CD cases mainly being a receptacle for the transport of the CDs.

SUMMARY OF THE INVENTION

In contradistinction to the prior CD cases, in one embodiment the subject CD cases are of a hinged clamshell variety and which have a central aperture through one surface of the clamshell at which is mounted a transparent window. The window is provided so that when the CDs are appropriately mounted and centered within the case, the top surface of the top most CD is visible through the central aperture. The central aperture thus provides for the viewing of whatever indicia are typically at the center region of the compact disc so that it may be viewed from outside the case. This gives the user an indication of what is within the case and more in particularly what is available at the center of the compact disc, it being understood that the entire case is itself opaque with the only transparent portion being at the central region of the top surface of the case.

In a preferred embodiment, the case is provided with a centrally apertured pocket into which can be inserted a leaflet, card, paper insert from CD packaging, CD covers, lyrics to songs or other indicia bearing devices which when inserted in the pocket is exposed at one surface thereof through the aforementioned window. This provides the ability for an individual to personalize his or her CD case with the insertion of a card or indicia-bearing sheet to display through the centrally located window whatever indicia is on the card or sheet. The pocket is in one embodiment affixed to the interior of the top surface of the case, with its aperture centered on the window-carrying aperture. Thus, in the instance that one does not wish to insert a card bearing indicia in this pocket, the CD thereunder can be viewed from the central window as mentioned above.

In one embodiment the insert-bearing pocket is secured on three sides to the top cover of the case and has a slit or other entrance aperture to one side to permit insertion of the indicia bearing card or sheet. To prevent tearing, the edge of the entrance aperture is curved and is removed sufficiently from the adjacent interior wall of the case that one can use one's fingers to insert or remove the card or sheet.

In addition, if it is desired to further protect the central window, a central piping detail is provided which countersinks the top surface of the window below the top surface of the case in which the window is mounted. This provides additional scratch resistance when for instance the CD case is carried in a suitcase or is laid upside down on a table or other surface.

Since the display case has a central window for the observation of indicia through the top surface, or can be provided with an indicia-bearing card within the aforementioned pocket, it is desirable to rack mount the CD cases with the window facing out such that they can be hung from a rack mount peg easily. The rack mounting apparatus should not be obtrusive and should not take away from the look of the case.

In one embodiment, the rack mounting fixture utilized is a transparent strap which runs between the hinge for the case and an overlying hinge cover integral to the top clamshell member of the case, with the free ends of the strap being joined together centrally above the top of the case as with a rivet to form a loop, so as to be able to hang the case by this loop over a peg in the rack.

This provides for exceedingly pleasing and balanced way of mounting the CD cases to a rack in a very unobtrusive and inexpensive manner. The utilization of the space between the hinge and the overlying hinge cover provides a space through which the strap can pass, thus to provide a convenient removable mounting fixture for mounting the CD cases to pegs on a rack.

In one embodiment the hinge cover includes a sheet which forms both the top and the bottom surfaces of the clamshell and runs from one surface over the hinge to the other surface. This manner of construction of the hinged clamshell provides for a space between the hinge and the hinge cover.

In short, the hinged clamshell structure of the CD case along with a single sheet forming the top surface and bottom surfaces of the clamshell and running across the hinge as a hinge cover provides for a convenient aperture through which the transparent strap can be inserted. This permits hanging the case from a central loop in the strap formed above the hinge cover by riveting of the ends of the strap together above the case.

In summary, a CD case in the form of a hinged clamshell is provided with a transparent display window central to one surface of the case, with the case being provided with CD holders or sleeves within the case mounted in such a way that the central portion of the CD is exposed through the transparent central window. The CD case permits the display of indicia on the CD contained therein through the window, or in an alternative embodiment a centrally apertured pocket is placed between the CD case window and the interior of the case, with the pocket being adapted to house indicia-carrying inserts for displaying the indicia through the central CD case window. In one embodiment, scratching of the window is minimized through the utilization of a piping detail around the periphery the window which spaces the exterior surface of the case from the exterior surface of the window, thus providing protection for the window. The CD case may also be provided with a convenient display hanger including a strap which passes between the hinge for the CD case and its overlying hinge cover, with distal ends of the strap being joined together in a central region above the CD case so as to form a loop for hanging of the CD case on a display rack. In one embodiment the strap is transparent so as to not take away from the appearance of the case when rack mounted.

BRIEF DESCRIPTION OF THE DRAWINGS

These and other features of the subject invention will be better understood in connection with the Detailed Description in conjunction with the Drawings, of which.

DETAILED DESCRIPTION

Figure 1:
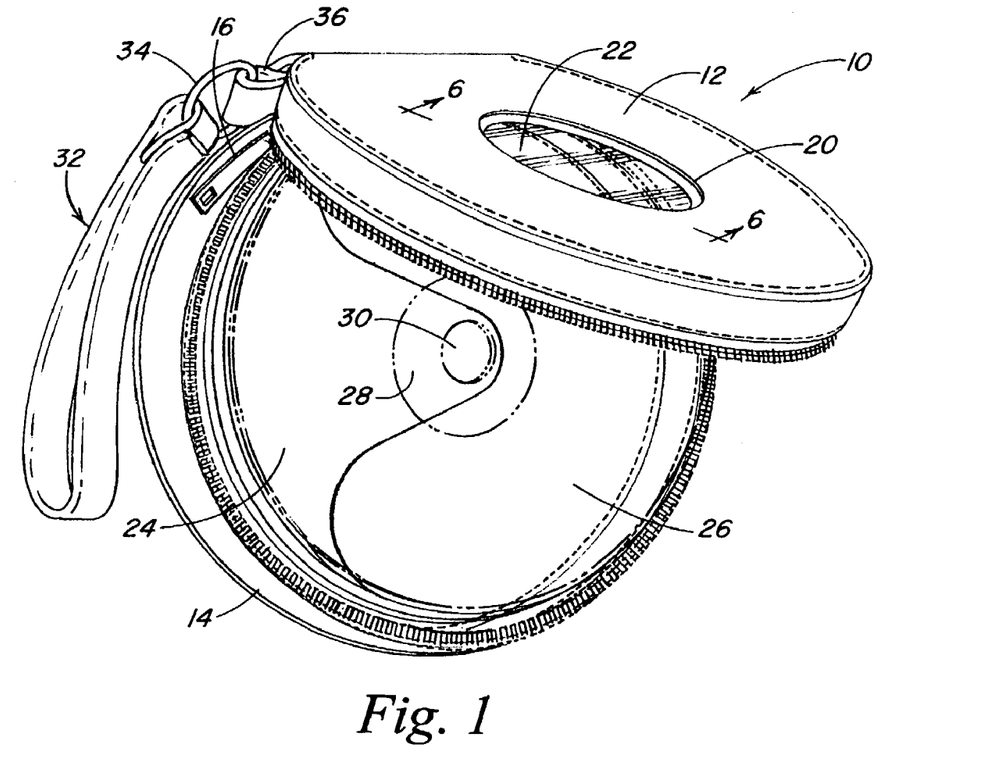
FIG. 1 is a perspective view of the subject CD case in an open condition illustrating the central transparent display window which overlies a compact disk centrally located within the case.

Referring now to FIG. 1, a CD case 10 is illustrated as having a top clamshell member 12 and a bottom clamshell member 14 which are zippered together via a zipper 16 to close the case.

An aperture 20 is provided within top member 12 and is provided with a transparent window 22 centered therein such that a CD ROM disk 24 housed in case 10 using an internal sleeve 26 can have a central region 28 of its top surface which is surrounds its spindle aperture 30 viewable through window 22 when the case is closed.

As mentioned hereinbefore, this provides the ability to view any indicia on the top surface of the CD in the case from the exterior of the case through window 22.

Also included is a carrying handle or strap 32 which is joined to the case through a ring 34 which goes through a loop 36 stitched into the top of the CD case.

Figure 2:
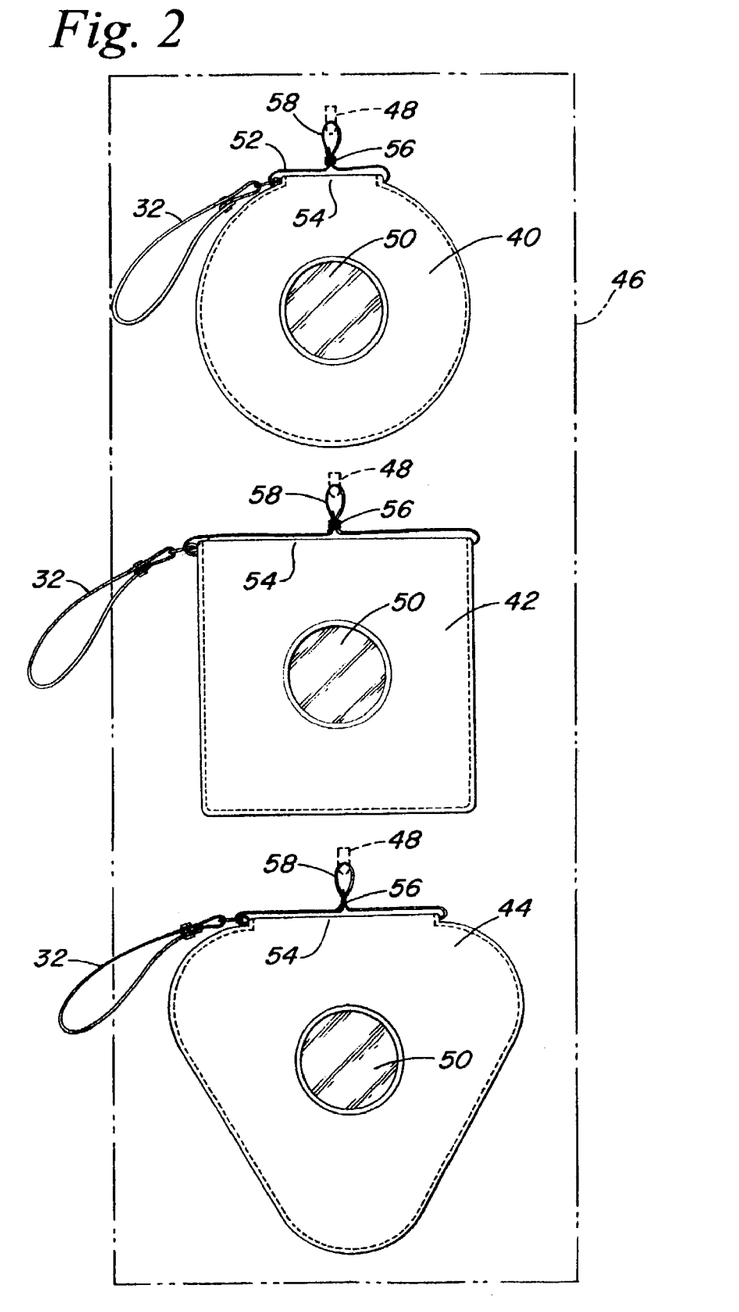
FIG. 2 is a diagrammatic illustration of the mounting of a number of CD cases to an upstanding display rack having hooks therein, with a transparent strap inserted through the CD case and looped to permit hanging the case on the display rack.

Referring now to FIG. 2, a number of CD cases here illustrated at 40, 42 and 44 may be hung from a display rack or case illustrated by dotted outline 46 from hooks or other protuberances 48 such that their central windows 50 are facing forward.

In order to provide such a mounting mechanism a loop strap 52 is provided which goes under and through a hinge portion 54 of the case and is joined together by a rivet or bolt 56 so as to form a loop 58 for mounting a display cases to a rack, wall or other upstanding member.

Figure 3A:
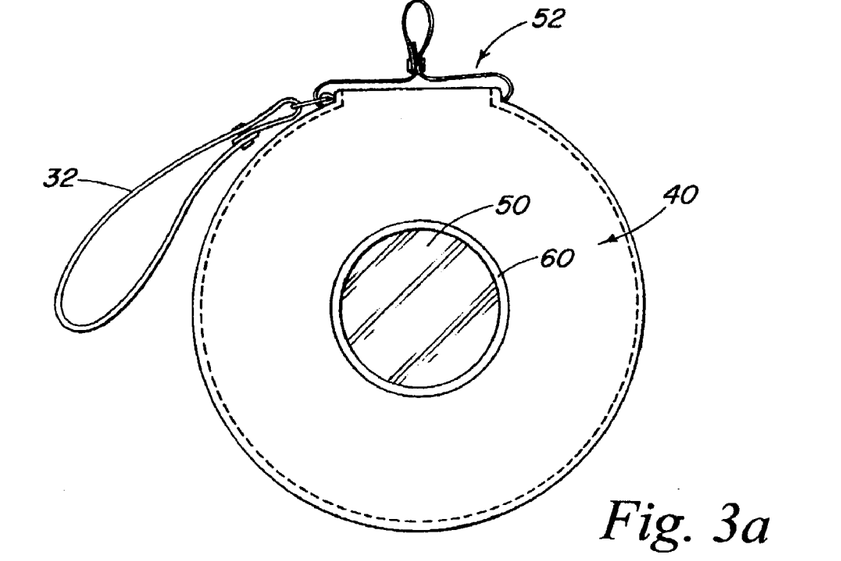
FIGS. 3A, 3B and 3C are front views of the subject display case illustrating a round case, a square case, and a triangular case.
Figure 3B:
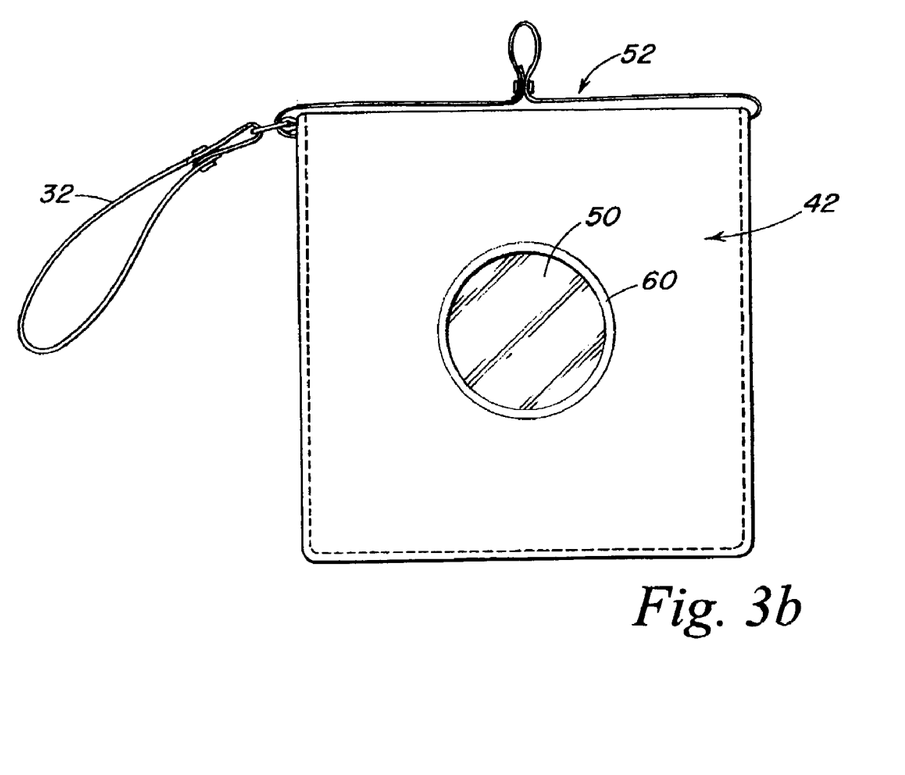
Figure 3C:
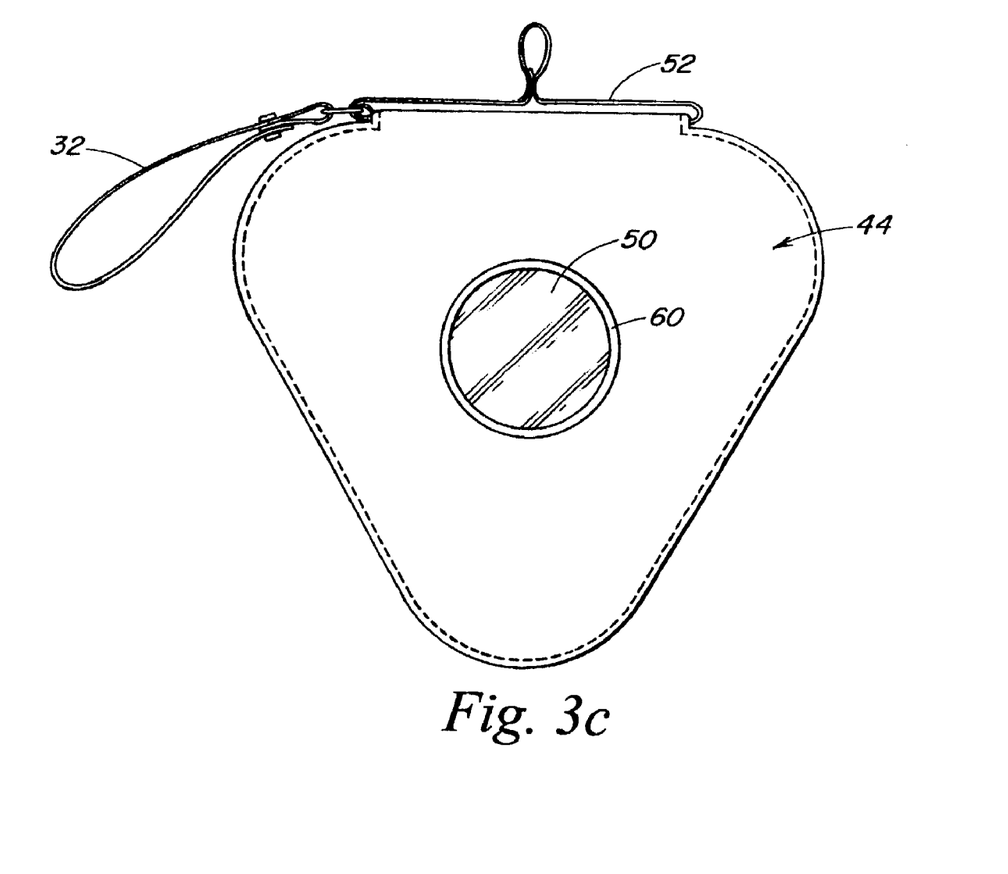

It will be noted that the subject invention having a central apertured window may be provided in a number of configurations, with circular, square and triangular configurations being depicted in FIG. 2. These configurations are illustrated in FIGS. 3A–3C in which like reference characters are utilized to indicate like elements between FIGS. 2 and 3.

It is a feature of the subject invention that each of the cases is provided with the aforementioned transparent window 50 which optionally may be surrounded with a piping detail 60 for either decorative purposes or to provide a counter sinking function for the window so as to protect the window from scratching.

Also shown is the aforementioned hanging fixture 52 which is removable for use and which is used to hang the CD cases on a display.

Figure 4:
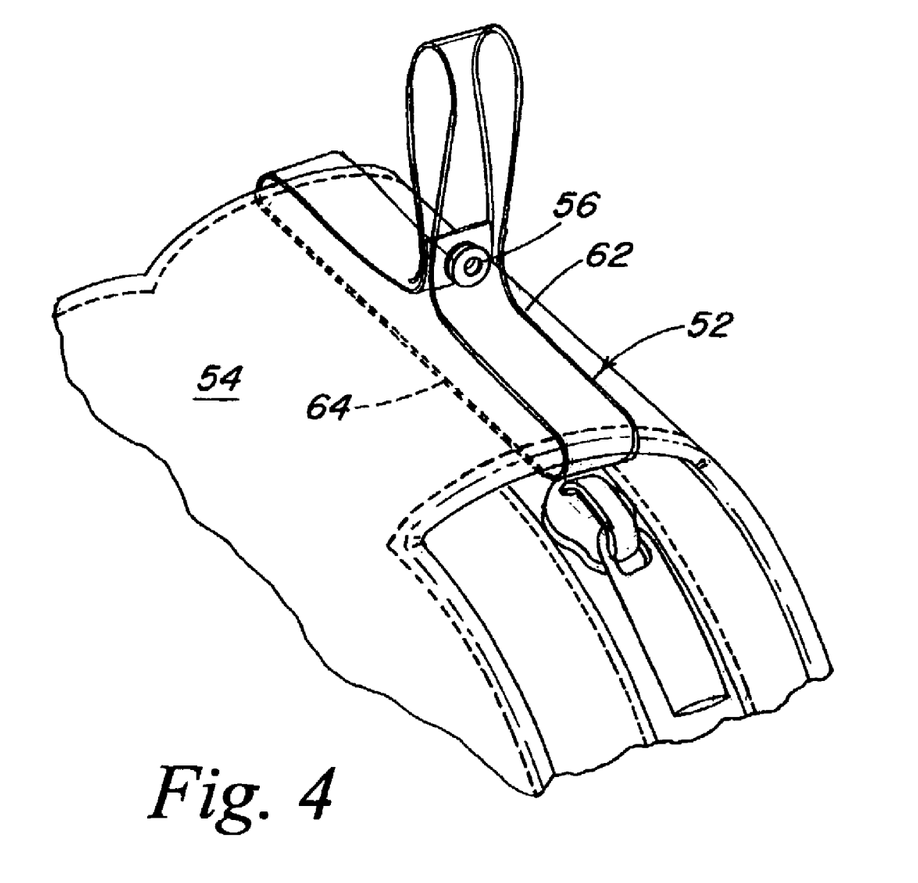
FIG. 4 is a perspective view of the hinge of the case of FIG. 1 and a transparent strap for mounting the CD case to a rack, indicating the placement of a transparent loop structure running through a hinge utilized to form the clamshell structure.

Referring now FIG. 4, hanging fixture 52 is illustrated as including a transparent ribbon 62 which runs under clamshell hinge 54 as illustrated by dotted outline 64, with the strap being completed through the utilization of rivet 56 so that the case can be conveniently provided with mounting apparatus.

Figure 5:
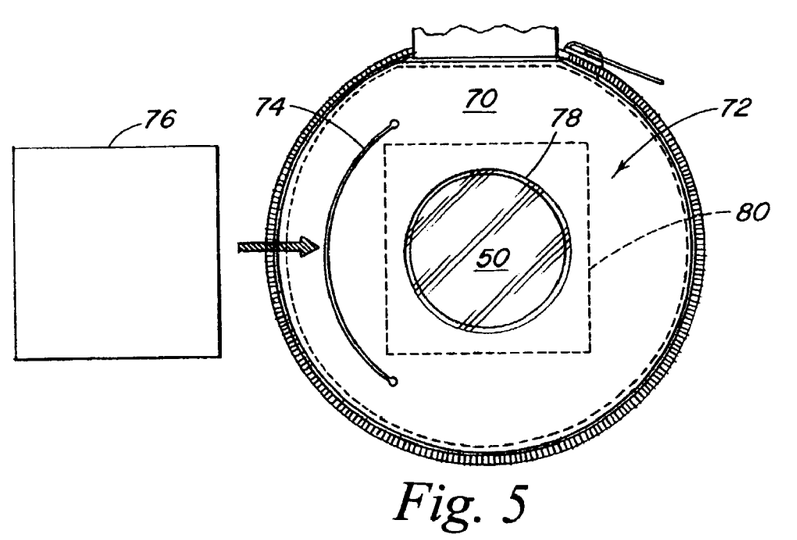
FIG. 5 is a diagrammatic illustration of the utilization of an internal pocket within the CD case of FIG. 1 to permit an indicia baring label to be inserted such that it is viewable through the transparent window thereof.

Referring now to FIG. 5, what is seen is the inside surface 70 of a card insert retaining sheet or member 72 which has a curved entrance slit 74 into which an indicia carrying card 76 may be inserted.

Sheet 70 has a central aperture 78 so as not to impede the view of an underlying top surface of a CD ROM disk assuming no indicia carrying card is inserted.

A card is shown inserted as illustrated by dotted outline 80 so that its top surface can be viewed through the window 50 in the top surface of the top clamshell member.

Figure 6:
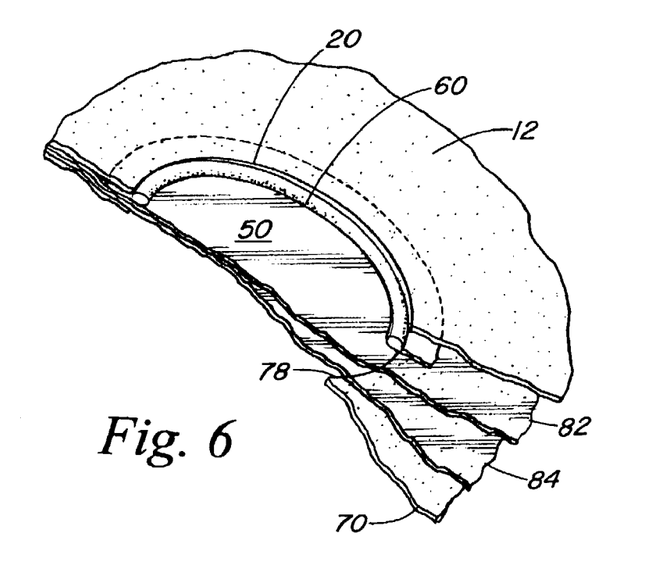
FIG. 6 is a partial cross sectional and plan view of the subject CD case, illustrating a transparent window located in an aperture in the top surface of the CD case, with the aperture having a piping detail to protect the window and having a second transparent layer into which the indicia baring card or label of FIG. 5 may be inserted.

How this is constructed is now described in connection with FIG. 6. Referring now to FIG. 6, a portion of the top surface 12 of the clamshell is illustrated as having the aforementioned central aperture 20 therethrough. The aperture is surrounded by the aforementioned piping detail 60 of FIGS. 3A, 3B or 3C, with the transparent window 50 being formed by a transparent layer 82 as illustrated.

In order to provide a pocket for the indicia bearing card 76 of FIG. 5, a second transparent layer 84 is formed underneath transparent layer 82, with layer 70 which is centrally apertured at 78 underlying layer 84.

In this manner the top surface of a CD carried within the case may be viewed through window 50 formed in this manner, with the indicia bearing card being insertable between layers 82 and 84 to provide the indicia visible through window 50 when such a card is inserted.

Figure 7:
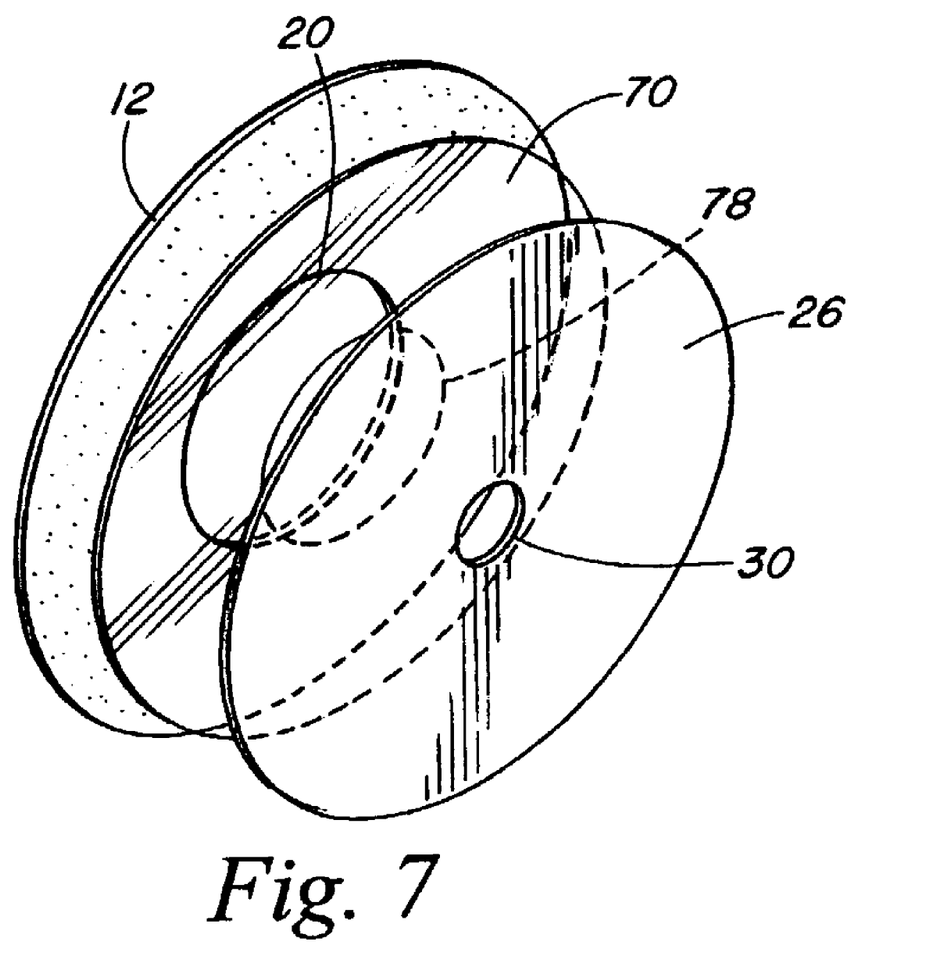
FIG. 7 is an exploded view of a portion of the CD case of FIG. 1 illustrating the mounting of a CD ROM disk within the case such that it is aligned with the windowed aperture in the top surface of the CD case as well as the aperture in an indicia baring card retaining sleeve so that the top surface of the CD can be viewed from the exterior of the case.

Referring now to FIG. 7, for a CD ROM disk 26, apertured layer 70 is shown coaxially centered upon spindle aperture 30, with aperture 78 in line with aperture 20 in top clamshell member 12.

The alignment of the apertures and the transparency of the windows is such that any indicia carried at the center portion of disk 26 will be viewable from outside the case.

Figure 8:
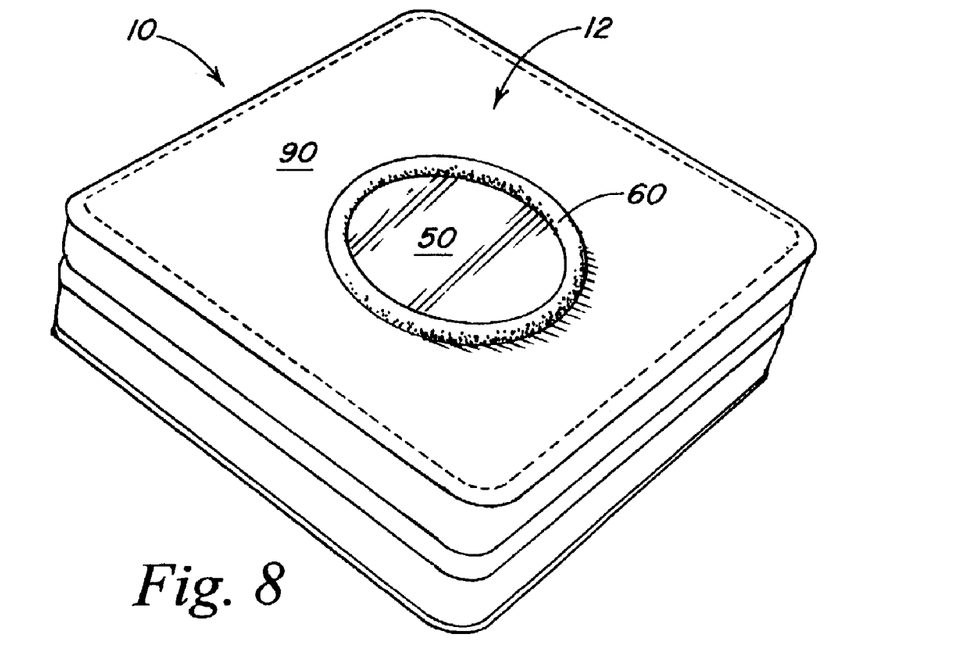
FIG. 8 is an isometric view of the one embodiment of the CD case illustrating the piping detail utilized to protect the central window thereof.

Referring now to FIG. 8, piping detail 60 is shown to extend above surface 90 of the top clamshell member 12 so as to provide protection for window 50 which is countersunk with respect to this piping detail.

Figure 9:
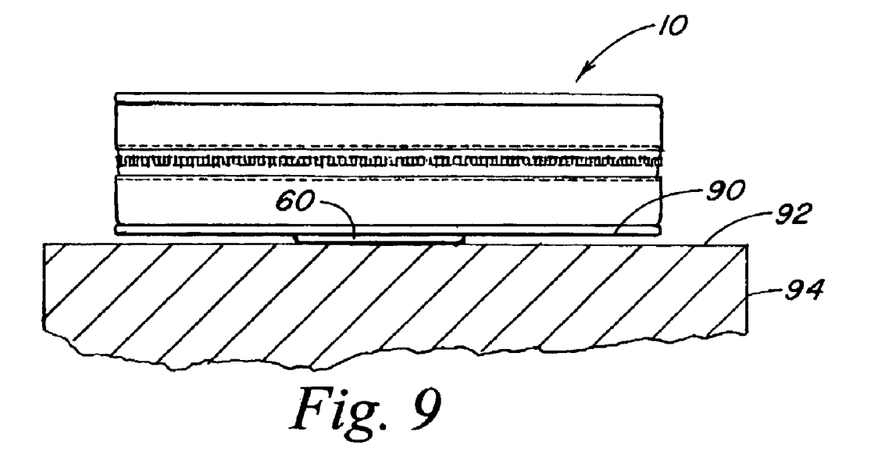
FIG. 9 is a cross sectional and side view of the case of FIG. 8, illustrating the spacing provided by the piping detail to protect the central window of the case; and, FIG. 10 is a diagrammatic illustration of a further embodiment of an indicia bearing pocket showing a stitched pocket substituted for the slot of FIG. 5.

Referring now to FIG. 9, it can be seen that piping detail 60 spaces surface 90 from the top surface 92 of a structure 94 so that window 50 of FIG. 8 is protected from being marred by this top surface.

Figure 10:
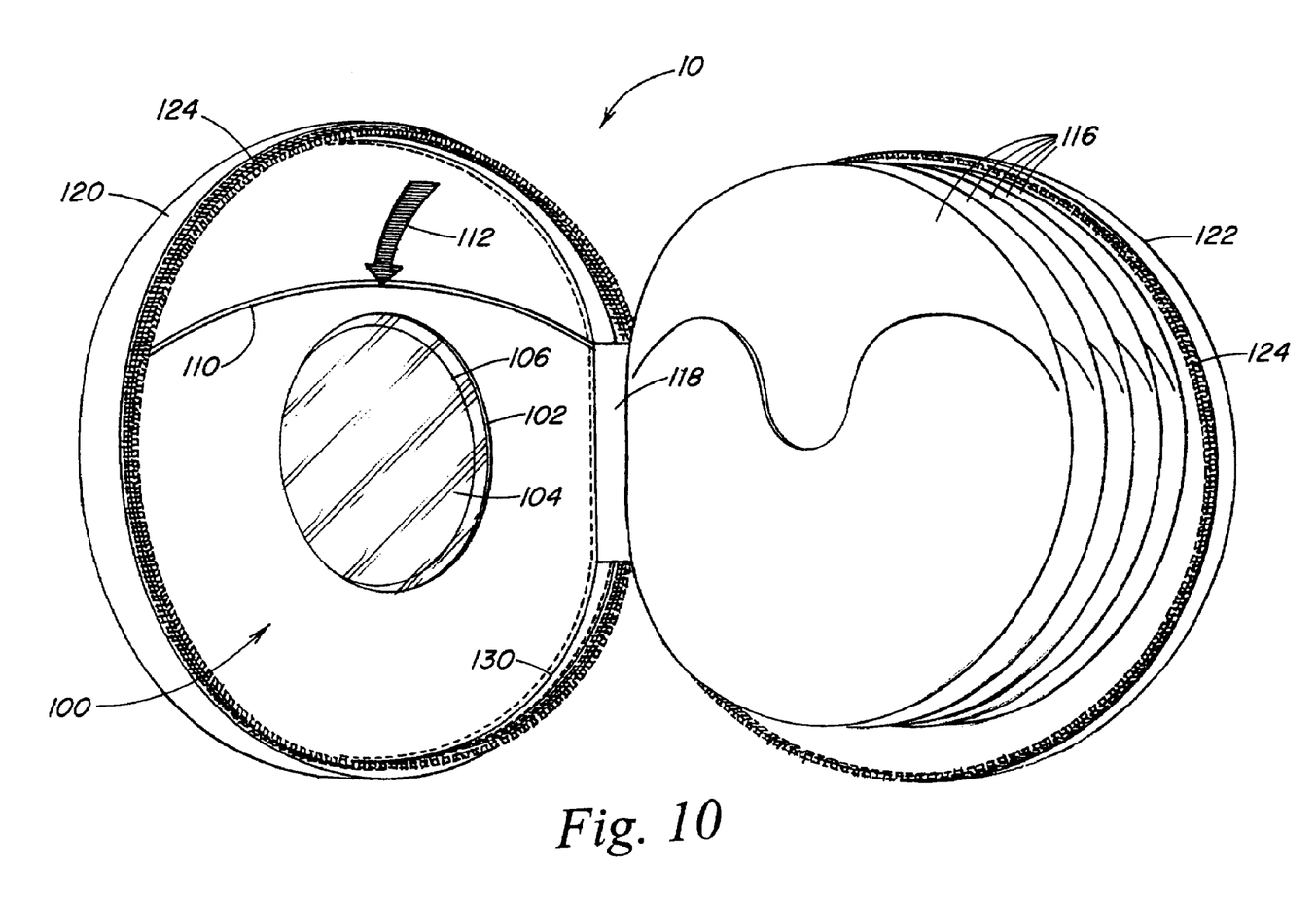

Referring now to FIG. 10, in an alternative embodiment slot 74 of FIG. 5 can be replaced with a stitched pocket 100.

Here case 10 includes a separate apertured pocket 100 which has a central aperture 102 in which is positioned an optional transparent window 104, with aperture 102 being coextensive with aperture 106 in the top surface of the top member of the CD case. Here a top edge 110 of pocket 100 is curved and admits the insertion of indicia as illustrated by arrow 1 12 when the case is opened as illustrated.

Here a number of CD carrying sleeves 116 are shown hingedly attached to the case at hinge 118, with case 10 having a top clamshell member 120 and a bottom clamshell member 122 also hinged together at 118. The two clamshell halves may be zippered together as illustrated by zipper 124 around the periphery of the clamshell halves.

While the stitched pocket is shown in connection with a circularly configured CD case, the stitched pocket has application to any particular configuration of the CD case. It is simply stitched by stitching 130 to the inside of top portion 120 as illustrated. The pocket is surrounded on all sided except the top by the aforementioned stitching, leaving top edge 110 free.

In this manner indicia which can be fairly large in size is easily inserted into the pocket and may contain, for instance, paper inserts from CD packaging, CD covers, lyrics to songs, or other indicia as desired.

It can thus be seen that CD case 10 can be provided with a central window either for viewing of an underlying CD top surface or for the viewing of an inserted indicia carrying card, while at the same time having the window being protected from scarring or marring through the optional piping detail.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended clams and equivalents thereto.

What is claimed is:

1. A compact disc case, comprising:
   a clamshell compact disc carrying case, said case having two clamshell members hinged by a strap there between at a top portion of said case;
   a window in a central region of the top clamshell member;
   a sleeve underneath said window in said case for receiving an indicia bearing card, said sleeve having a bottom side and an entrance slot to one side thereof, said bottom side having an aperture centered on said window; and,
   a compact disc holder in said case for positioning a compact disc such that the center portion of the top surface thereof is visible through the aperture in said sleeve and said window.

2. The case of claim 1, and further including a hinge member between said clamshell sections.

3. The case of claim 2, wherein said hinge member is integral to the top surfaces of said clamshell sections.

4. The case of claim 2, and further including a case hanging fixture including a portion running underneath a portion of said hinge member and including a loop extending above said hinge member for the hanging of said case.

5. The case of claim 4, wherein said hanging fixture includes a looped strap.

6. The case of claim 5, wherein said looped strap is transparent so as to be nearly invisible when used to hang said case.

7. The case of claim 1, and further including a raised piping detail around the periphery of said window positioned to extend outwardly from the top surface of said top clamshell member to space said window from any surface said case is rested on, thus to preserve said window.

8. The case of claim 1, wherein the aperture central on said window includes a window.

9. The case of claim 1, wherein said strap is integral to each of said clamshell members.

10. The case of claim 9, wherein the top surfaces of said clamshell members and said strap are made from the same piece of material.

* * * * *